United States Patent [19]

Hamada et al.

[11] Patent Number: 4,890,686
[45] Date of Patent: Jan. 2, 1990

[54] DRIVE MODE SELECTING SYSTEM FOR FOUR-WHEEL-DRIVE MOTOR VEHICLE

[75] Inventors: Tetsurou Hamada; Katsuhiko Masuda; Kazunori Shibuya; Kazuhiko Shimada; Shoji Tokushima, all of Tochigi, Japan

[73] Assignee: Honda Giken Kogyo Kabushiki Kaisha, Tokyo, Japan

[21] Appl. No.: 247,191

[22] Filed: Sep. 21, 1988

[30] Foreign Application Priority Data

Sep. 22, 1987 [JP] Japan .................. 62-238359

[51] Int. Cl.⁴ ............................ B60K 23/08
[52] U.S. Cl. .................. 180/233; 364/424.1
[58] Field of Search ............ 180/233, 247, 248, 249, 180/250; 364/424.1

[56] References Cited

U.S. PATENT DOCUMENTS 4,605,087  8/1986  Ashauer et al. .............. 180/248
4,723,624  2/1988  Kawasaki et al. ............. 180/247
4,744,435  5/1988  Schnurer ...................... 180/233

FOREIGN PATENT DOCUMENTS 59-188731  12/1984  Japan .

Primary Examiner—John A. Pekar
Attorney, Agent, or Firm—Armstrong, Nikaido, Marmelstein, Kubovcik & Murray

[57] ABSTRACT

A drive mode selecting system for a four-wheel-drive motor vehicle includes a drive system for driving a first axle drive mechanism and a second axle drive mechanism, a clutch for selectively rigidly connecting the first and second axle drive mechanisms through the drive system for transmitting relative torque between the first and second axle drive mechanisms, and disconnecting the first and second axle drive mechanisms, a brake operation detector for detecting operation of a brake of the motor vehicle, an accelerator operation detector for detecting operation of an accelerator of the motor vehicle, and a controller responsive to detected signals from the brake operation detecting means and the accelerator operation detecting means for applying a disengaging signal to the clutch means to disconnect the first and second axle drive mechanisms when the detected signals indicate that the brake is operated and the accelerator is not operated.

5 Claims, 2 Drawing Sheets

DRIVE MODE SELECTING SYSTEM FOR FOUR-WHEEL-DRIVE MOTOR VEHICLE

BACKGROUND OF THE INVENTION

1. Field of the Invention

The present invention relates to a drive mode selecting system for a four-wheel-drive motor vehicle having a drive system capable of driving a front wheel drive mechanism and a rear wheel drive mechanism, and more particularly to a drive mode selecting system for a four-wheel-drive motor vehicle having a drive system including a clutch for interconnecting front and rear wheel drive mechanisms substantially rigidly for transmitting relative torque between these front and rear wheel drive mechanisms.

2. Description of the Relevant Art

Japanese Laid-Open Utility Model Publication No. 59-188731 discloses a four-wheel-drive (4WD) motor vehicle in which front and rear wheels are coupled to each other substantially rigidly through a drive system having a viscous fluid coupling, the drive system also including a clutch disposed between the front and rear wheels and disengageable to cut off the transmission of drive power to the rear wheels when the motor vehicle is braked.

By thus cutting off the transmission of drive power to the rear wheels when the brake is applied, the distribution of braking forces to the front and rear wheels while the motor vehicle is running is prevented from being varied due to the limited differential capability of the viscous fluid coupling.

In some automatic transmission 4WD motor vehicles employing such a clutch, the front wheels are directly coupled to the engine, and drive power from the engine is transmitted through the clutch to the rear wheels. When the accelerator pedal is depressed while depressing the brake pedal, the brake is applied and the transmission of the drive power to the rear wheels is cut off. Therefore, the drive power is transmitted only to the front wheels, and the speed of rotation of the rear wheels is greatly lowered as compared with the front wheels as shown in FIG. 5 of the accompanying drawings. Since there is still large differential rotation between the front and rear wheels even after the brake is released, where the clutch comprises a dog clutch, the dog clutch cannot immediately be engaged due to such differential rotation.

SUMMARY OF THE INVENTION

In view of the drawbacks of the conventional four-wheel-drive motor vehicles, it is an object of the present invention to provide a drive mode selecting system for a four-wheel-drive motor vehicle, which includes a clutch such as a dog clutch capable of smoothly changing the drive mode from an all-wheel-drive mode to a front-wheel-drive mode or a rear-wheel-drive mode or vice versa.

Another object of the present invention is to provide a drive mode selecting system for a four-wheel-drive motor vehicle, which includes a dog clutch that can smoothly be shifted from a disengaged condition caused by braking the motor vehicle to an engaged condition, so that any delay in bringing the drive mode back to a four-wheel-drive mode for accelerating the motor vehicle again can be eliminated.

According to the present invention, there is provided a drive mode selecting system for a four-wheel-drive motor vehicle, comprising: a drive system for driving a first axle drive mechanism and a second axle drive mechanism; clutch means selectively rigidly connecting the first and second axle drive mechanisms through the drive system for transmitting relative torque between the first and second axle drive mechanisms, and disconnecting the first and second axle drive mechanisms; brake operation detecting means for detecting operation of a brake of the motor vehicle; accelerator operation detecting means for detecting operation of an accelerator of the motor vehicle; and control means responsive to detected signals from the brake operation detecting means and the accelerator operation detecting means for applying a disengaging signal to the clutch means to disconnect the first and second axle drive mechanisms when the detected signals indicate that the brake is operated and the accelerator is not operated.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
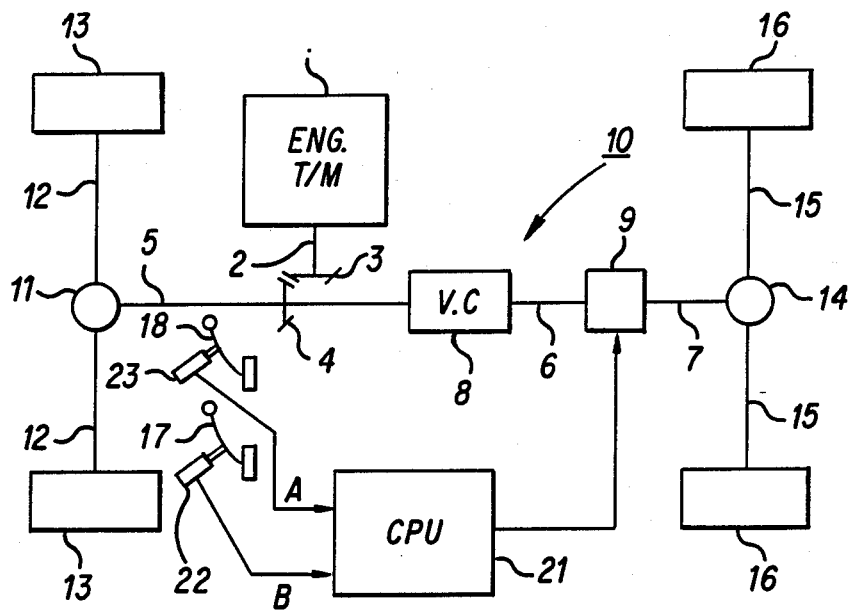
FIG. 1 is a schematic plan view of a drive mode selecting system for a four-wheel-drive motor vehicle according to an embodiment of the present invention.

Like or corresponding parts are denoted by like or corresponding reference numerals throughout views.

FIG. 1 schematically shows a drive mode selecting system for a four-wheel-drive motor vehicle. The four-wheel-drive motor vehicle has a propeller shaft assembly 10 extending longitudinally through the center of the motor vehicle and including a first propeller shaft 5, a second propeller shaft 6, and a third propeller shaft 7. The first propeller shaft 4 in a front portion of the propeller shaft assembly 10 is operatively coupled to an output shaft 2 of a drive power source 1 comprising an engine and a transmission through a coupling such as a gear mechanism comprising bevel gears 3, 4, so that drive power from the drive power source 1 can be transmitted through the coupling to the first propeller shaft 5. The front propeller shaft 5 has a front end coupled to a front wheel drive mechanism or a front wheel axle drive mechanism. The front wheel drive mechanism comprises a front differential 11 connected to the front end of the first propeller shaft 5, and two drive axles 12 extending laterally from the front differential 11 and coupled to front wheels 13, respectively.

The rear end of the first propeller shaft 5 is coupled through a viscous fluid coupling 8 serving as a central differential to the second propeller shaft 6. The second propeller shaft 6 has a rear end coupled to the third propeller shaft 7 through a clutch means including an actuator, i.e., a dog clutch 9 in this embodiment. The rear end of the third propeller shaft 7 is coupled to a rear wheel drive mechanism or a rear wheel axle drive mechanism. The rear wheel drive mechanism comprises a rear differential 14 and two drive axles extending laterally from the rear differential 14 and coupled to rear wheels 16, respectively. The motor vehicle also has a brake pedal 17 and an accelerator pedal 18.

The propeller shaft assembly 10 and the drive power source 1 for transmitting drive power to the propeller shaft assembly 10 through the gear mechanism jointly constitute a drive system for driving the front and rear wheel drive mechanisms, i.e., the front and rear wheels 13, 16. The drive power selector system includes a control means comprising a computer (CPU) 21 mounted on the motor vehicle, the computer 21 being supplied with a detected signal B from a brake operation detector means 22 associated with the brake pedal 17 for detecting the application of the brake, and a detected signal A from an accelerator operation detector means 23 associated with the accelerator pedal 18 for detecting the operation of the accelerator. The computer 21 controls the engagement and disengagement of the dog clutch 9 based on the detected signals A, B.

Figure 3:
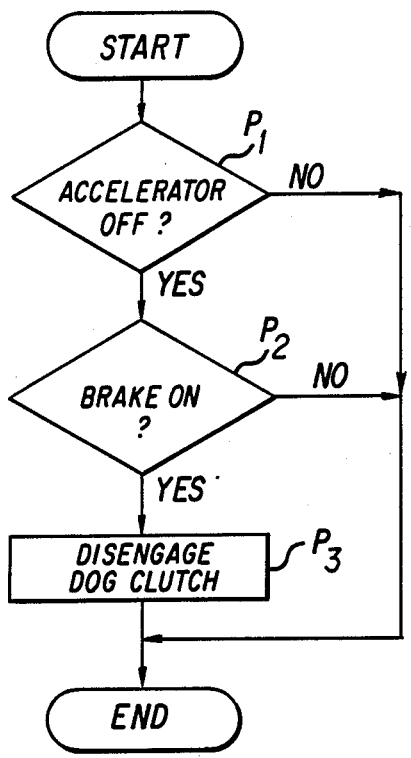
FIG. 3 is a flowchart of a control sequence for engaging and disengaging a clutch in the drive mode selecting system in response to the application of a brake and the operation of an accelerator.

In operation, as shown in FIG. 3, the computer 21 determines the accelerator signal A is OFF or not in a step P1. If the signal A is OFF, then control goes to a step P2. If the signal A is ON, then the computer 21 keeps the dog clutch 9 engaged. The step P2 determines whether the brake signal B is ON or not. If the brake signal B is ON, i.e., the brake is applied, then the computer 21 issues a signal to disengage the dog clutch 9 in a step P3. If the brake signal B is OFF, the computer 21 keeps the dog clutch 9 engaged.

Therefore, when the brake is applied and the accelerator is not operated, the dog clutch 9 is disengaged to drive the front wheels 13 only. Otherwise, e.g., when the brake is applied and the accelerator is operated, the dog clutch 9 remains engaged against disengagement to allow the motor vehicle to run in a four-wheel-drive mode in which the front and rear wheels 13, 16 are substantially rigidly coupled to each other through the viscous fluid coupling 8 disposed in the drive system between the front and rear wheel drive mechanisms.

Figure 4:
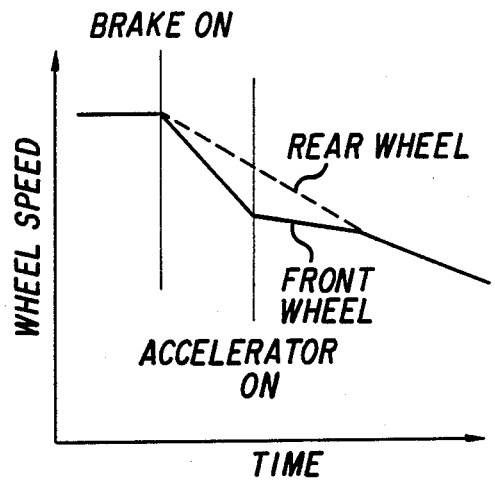
FIG. 4 is a graph showing the manner in which the speeds of front and rear wheels vary with time while the clutch is being controlled by the control sequence shown in FIG. 3, especially after the clutch is disengaged by the application of the brake and until the clutch is engaged by the operation of the accelerator.
Figure 5:
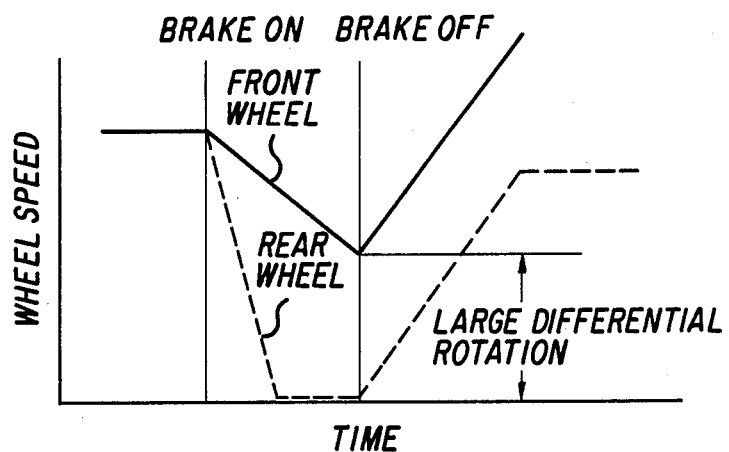
FIG. 5 is a graph showing how the speeds of front and rear wheels vary with time when the clutch in a conventional drive mode selecting system is controlled when the brake is applied and released.

According to the aforesaid control sequence for the engagement and disengagement of the dog clutch, when the brake pedal 17 is first depressed to disengage the dog clutch 9 and then the accelerator pedal 18 is depressed, as shown in FIG. 4, while the motor vehicle is running, the dog clutch 9 is engaged again to bring the drive system smoothly back to the four-wheel-drive mode.

More specifically, when the accelerator is operated and the brake is applied, the dog clutch 9 is disengaged. The distribution of braking forces to the front and rear wheels is generally selected such that stronger braking forces are applied to the front wheels than to the rear wheels. Therefore, when the running motor vehicle is braked, the speed of rotation of the front wheels is more rapidly lowered than the speed of rotation of the rear wheels. If the accelerator pedal 18 is depressed while the brake pedal 17 is being depressed, the accelerator is back in operation, thus causing the computer 21 to produce a signal to engage the dog clutch 9. If the differential rotation between the front and rear wheels at this time is small as shown in FIG. 4, the dog clutch 9 can easily be engaged. Consequently, the conventionally experienced delay in bringing the drive system back into the four-wheel-drive mode for accelerating the motor vehicle again after it has been braked can be eliminated.

Figure 2:
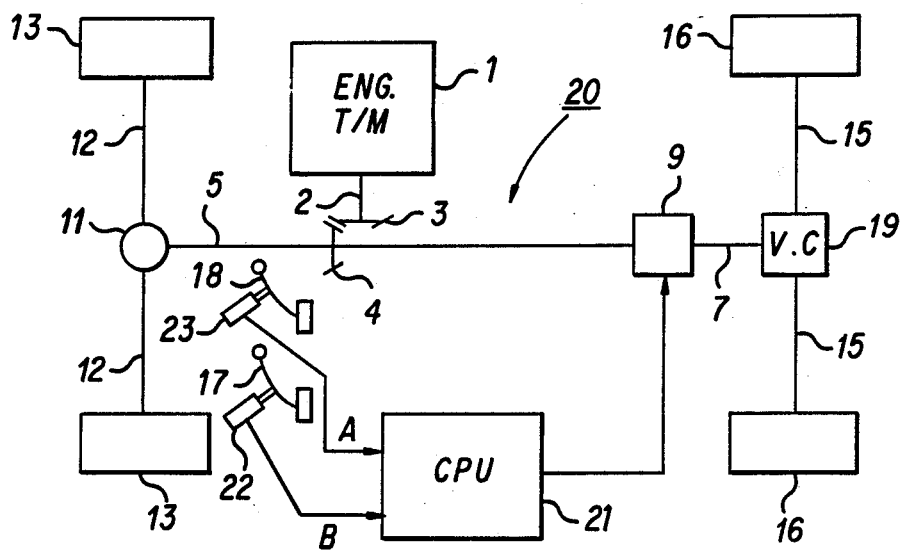
FIG. 2 is a schematic plan view of a drive mode selecting system for a four-wheel-drive motor vehicle according to a modification.

In the embodiment shown in FIG. 1, the viscous fluid coupling 8 is employed as a central differential in the propeller shaft assembly 10. However, according to a modification shown in FIG. 2, a drive system 20 dispenses with the viscous fluid coupling 8 and the second propeller shaft 6, and the rear differential 14 (FIG. 1) is replaced with a viscous fluid coupling 19 which doubles as a central differential.

The detecting means 22, 23 may be located in other desired positions than illustrated and be of any of suitable structures. The present invention is also applicable to a four-wheel-drive wheel in which the rear wheels are drive wheels and the rear wheels are driven wheels.

With the present invention, as described above, in the four-wheel-drive motor vehicle with the dog clutch incorporated in the drive system which interconnects the front and rear wheels substantially rigidly, only when the detected signal from the brake application detecting means is ON and the detected signal from the accelerator operation detecting means is OFF, the dog clutch is allowed to be disengaged, and otherwise the dog clutch is inhibited from being disengaged or remains engaged. Therefore, when depressing the brake pedal and the accelerator pedal at the same time in an automatic transmission 4 WD motor vehicle in which the front wheels are directly coupled to the engine and drive power is transmitted to the rear wheels through the dog clutch, the motor vehicle is kept in the four-wheel-drive mode in which the front and rear wheels are coupled to each other substantially rigidly. When only the brake is applied while the motor vehicle is running, the dog clutch is disengaged to prevent the distribution of braking forces to the front and rear wheels from being varied. Moreover, when the accelerator pedal is subsequently depressed with the brake pedal being depressed, the drive system is smoothly brought back into the four-wheel-drive mode.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A drive mode selecting system for a four-wheel-drive motor vehicle, comprising:
a drive system for driving a first axle drive mechanism and a second axle drive mechanism;
clutch means selectively rigidly connecting said first and second axle drive mechanisms through said drive system for transmitting relative torque between the first and second axle drive mechanisms, and disconnecting said first and second axle drive mechanisms;

brake operation detecting means for detecting operation of a brake of the motor vehicle;

accelerator operation detecting means for detecting operation of an accelerator of the motor vehicle; and control means responsive to detected signals from said brake operation detecting means and said accelerator operation detecting means for applying a disengaging signal to said clutch means to disconnect said first and second axle drive mechanisms when said detected signals indicate that said brake is operated and said accelerator is not operated, and wherein said control means further includes means for applying an engaging signal to said clutch means to connect said first and second axle drive mechanisms when at least the detected signal from said accelerator operation detecting means indicates that the accelerator is operated.

2. A drive mode selecting system according to claim 1, wherein said drive system comprises a drive power source including at least an engine and a transmission for producing drive power, a propeller shaft assembly coupled to said drive power source and having opposite ends connected to said first and second axle drive mechanisms, respectively, for transmitting the drive power from said drive power source to said first and second axle drive mechanisms, and a viscous fluid coupling disposed in said propeller shaft assembly, said clutch means comprising a dog clutch disposed in said propeller shaft assembly.

3. A drive mode selecting system according to claim 2, wherein said first axle drive mechanism includes a first differential to which the drive power from said drive power source can directly be applied through said propeller shaft assembly at all times, and a first wheel drive axle coupled to said first differential, said second axle drive mechanism comprising a second wheel drive axle rotatable by the drive power from said drive power source which is applied from said propeller shaft assembly through at least said dog clutch.

4. A drive mode selecting system according to claim 3, wherein said second axle drive mechanism includes a second differential to which the drive power from said drive power source can be applied from said propeller shaft assembly through said dog clutch.

5. A drive mode selecting system according to claim 3, wherein said viscous fluid coupling is employed as said second differential.

* * * * *